July 15, 1969     A. N. SPANEL     3,455,306

ELASTOMERIC GIRDLE WITH SPOT BONDED FABRIC LINING

Original Filed March 13, 1961     2 Sheets-Sheet 1

INVENTOR
Abraham N. Spanel

BY

ATTORNEY

July 15, 1969     A. N. SPANEL     3,455,306
ELASTOMERIC GIRDLE WITH SPOT BONDED FABRIC LINING
Original Filed March 13, 1961     2 Sheets-Sheet 2
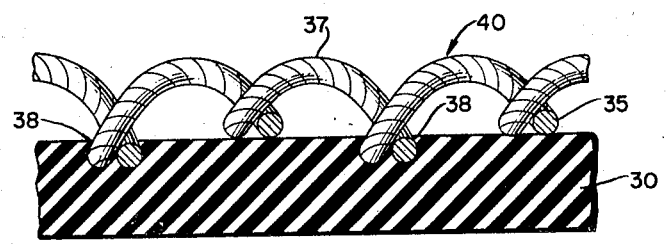
FIG. 5.
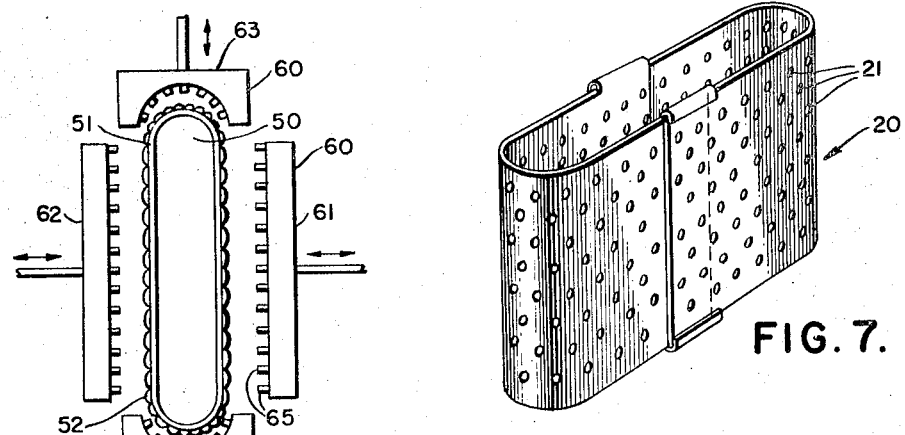
FIG. 6.
FIG. 7.
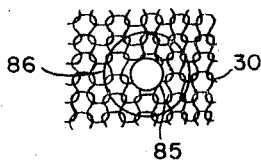
FIG. 9.
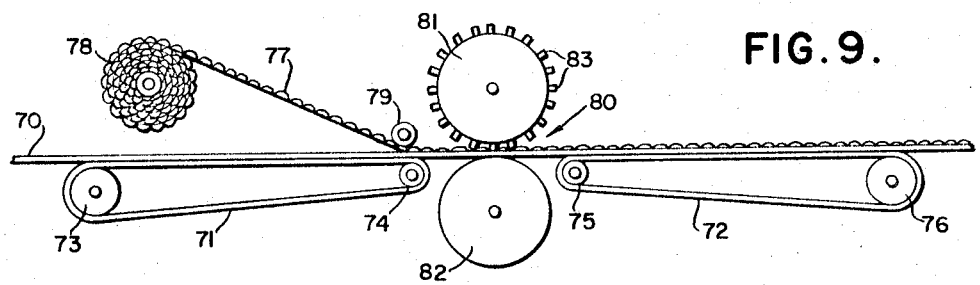
FIG. 8.
INVENTOR
Abraham N. Spanel
BY *Lewis H. Lauman*
ATTORNEY

United States Patent Office 3,455,306
Patented July 15, 1969

3,455,306
ELASTOMERIC GIRDLE WITH SPOT BONDED FABRIC LINING
Abraham N. Spanel, Princeton, N.J., assignor to International Playtex Corporation, Dover, Del., a corporation of Delaware
Continuation of application Ser. No. 95,094, Mar. 13, 1961. This application Feb. 25, 1966, Ser. No. 536,529
Int. Cl. A41c 1/04; D03d 3/04
U.S. Cl. 128—521                7 Claims This application is a continuation of application Ser. No. 95,094, filed Mar. 13, 1961, and now abandoned.

My invention relates to elastic girdles of composite structure having a figure controlling rubbery sheath of latex or other elastomer and an absorbent cloth lining for contact with the skin of the wearer.

Girdles which are rubber-fabric composites or laminates require that the fabric lining be securely adhered to the rubber so as not to delaminate in normal use. At the same time the fabric must have the characteristic of being extensible with the elastomeric sheath, since the girdle must be highly stretched when putting it on, and also when wearing it in order to provide both figure control and comfort. Such extensibility may be accomplished with fabrics made of synthetic yarns, such as nylon of the Helanca or Banlon type which are crimped or coiled, the fabric being bonded or adhesively laminated to the rubbery sheath throughout substantially the entire available contact area between the sheath and fabric liner. Although such synthetic fabric liners provide a soft fabric feel in contact with the skin, and avoid objectionable direct contact of the rubber with the skin, it is highly desirable to provide a liner in which the skin-contacting portion has a higher moisture absorbency and cool feeling against the skin characteristic of fabrics of certain natural fibers, for example, cotton or the like. However, these highly absorbent fabrics which act to wick up body perspiration and facilitate evaporation, such as through perforations in the elastomeric sheath, do not possess the stretch characteristics required. When the fabric is sufficiently embedded in the rubber substrate, or the adhesive layer acting as the bonding medium, to properly anchor the fabric to the rubber sheath, the inadequacy of stretch characteristic of the fabric is aggravated, and in turn the extensibility of the rubber-fabric laminate or composite is unfavorably reduced.

I have overcome these difficulties and limitations by my invention so that fabrics having high absorbency, such as cotton cloth, or fabrics of blended yarns, such as cotton and nylon, or other synthetic fibers, may be utilized in an elastomeric girdle liner to provide a lining securely anchored to the elastomeric substrate while retaining the stretch characteristics desired in the composite structure. This, I accomplish, by intervally bonding the liner to the elastomer sheath so that the fabric between the spaced bonding sites or anchorages may stretch to the fullest extent of its capability. In contrast, in the limited bonded areas, the fabric may be embedded to the fullest extent required to give secure anchorage of the liner to the rubber substrate and thus insure against delamination.

By means of my invention I have substantially eliminated the necessity of controlling the degree of penetration of the bonding adhesive, or conversely the degree of embedding of the liner into the rubber substrate to which it is laminated. The discontinuous or spaced-contact bonding gives the liner freedom to stretch throughout the unanchored or unbonded areas. The unimpeded stretch in each unanchored or unbonded area is adequate to provide on a cumulative basis, the total circumferential stretch required for the garment. The size of the adhesive areas is not critical, and it may even be smaller than the spacing between such areas. In general, it is suggested that the aggregate area of the spaced bonding sites could fall between about one-tenth and one-half of the total contact area between the rubber sheath and fabric liner, although the bonding sites may occupy a somewhat larger fraction of the total area without significant reduction in extensibility of the composite. In such arrangement, the spaced bonding sites may include some points of crossing of the courses and wales in the knit fabric, but the majority of the knit fabric loops are left unattached to the substrate. Also, the spaced bonding is such that only part of the raised exposed yarn surfaces contacting the substrate are bonded to it to maintain most of the fabric's unbonded extensibility.

My invention will be described in greater detail in conjunction with the accompanying drawings which merely illustrate various embodiments thereof, and means for carrying out the same, but which are not intended to constitute a limitation thereon, wherein;

FIGURE 5 shows the liner fabric of FIGURE 4 intervally bonded to a rubber girdle substrate without an adhesive layer.

FIGURE 6 illustrates diagrammatically a device for interval bonding of a fabric liner to a seamless dipped rubber girdle film on the dipping form.

FIGURE 7 illustrates in perspective a perforated shield for interval application of bonding adhesive to a dipped rubber film.

FIGURE 8 illustrates schematically a device for interval bonding of the fabric to sheet rubber stock.

FIGURE 9 is a schematic view of an embodiment in which perforatons are provided through the adhesive spots.

Figure 1:
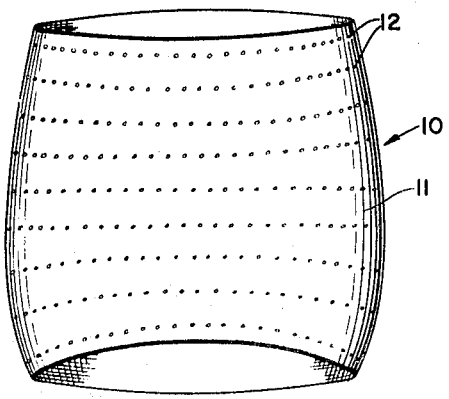
FIGURES 1 and 2 are schematic views of a latex rubber girdle sheath with a suitable adhesive applied at intervals for spaced bonding of the fabric liner, the sheath being shown inside out.
Figure 2:
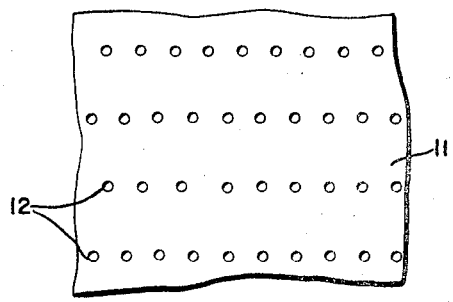

Referring to FIGURES 1 and 2, a seamless dipped latex rubber girdle film 10 formed on a dipping mold (see FIGURE 6) in accordance with my Patent 2,360,736 has applied to the exposed surface 11 of the rubber sheath, a multiplicity of spaced spots 12 of a suitable adhesive for interval bonding of the fabric liner. This may be accomplished by means of a suitable perforated shield 20 as shown in FIGURE 7 which is slidably adjustable for placing it in close proximity to the rubber sheath surface. The adhesive may then be deposited onto the rubber surface through the spaced apertures 21 in the shield by spraying, brushing or other suitable methods to provide staggered rows of spaced adhesive spots 12.

The spaced adhesive spots may be disposed in any suitable pattern or randomly distributed, the balance of the substrate surface being free of the bonding agent. For instance, in FIGURE 2 the spots are positioned in horizontal rows in which the spots 12 are staggered in adjacent rows. The spots may be about 1/16 to 3/16 inch or more in diameter with a spacing of from about 1/4 up to 3/4 inch or more between centers of the spots in each horizontal row, and a spacing of from about 1/4 or 3/8 inch up to an inch or more on center between spots in adjacent vertical rows. In general, the smaller spacing is used with smaller spots and the larger spacing with larger spots. A larger vertical spacing provides somewhat less anchorage in the vertical direction. The purpose of this refinement, which is not essential, is to compensate for the generally lower stretch of the fabric in the vertical direction than in the girthwise direction.

It should be emphasized that the dimensions given with reference to FIGURE 2 are not critical, but represent simply a specific or advantageous embodiment of the invention.

Figure 2A:
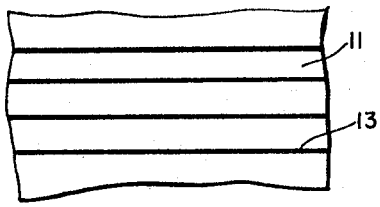
FIGURES 2a and 2b illustrate other patterns of adhesive application for interval bonding.
Figure 2B:
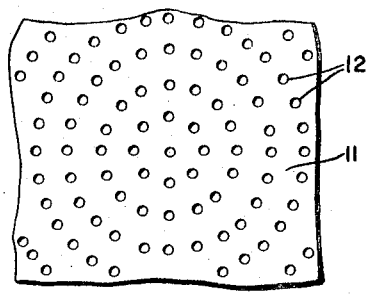

FIGURES 2a and 2b show variations in the distribution of adhesive for interval bonding, the former showing the adhesive disposed in stripes or lines 13, which may be oriented in any direction desired, and the latter showing a concentric circular pattern or adhesive spots 12. With reference to the circular pattern of adhesive spots, a higher density of adhesive spots occurs in the central portion. This has the advantage of providing greater anchorage of the fabric in selected areas, for example, in the abdominal area of the girdle. Such additional anchorage or embedding of the fabric provides an increase in modulus of the rubber-fabric composite, that is, requires a greater force to stretch, or tends to limit the degree of stretch so that a greater control or flattening action is exerted by the garment in such areas.

Figure 3:
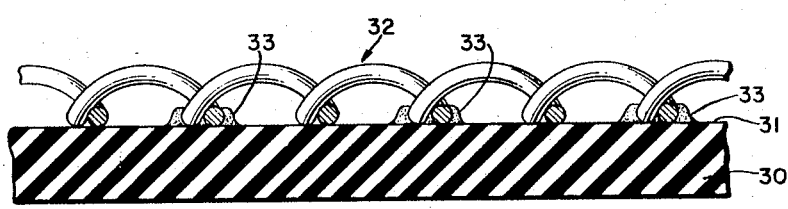
FIGURE 3 is an enlarged schematic fragmentary view of the composite girdle structure with interval bonding of the absorbent fabric liner.
Figure 4:
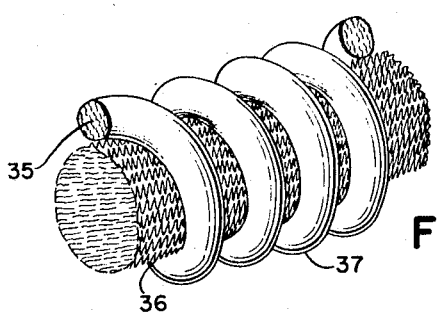
FIGURE 4 is a schematic fragmentary view of a composite yarn with a synthetic filament stretch yarn core and non-stretch cotton overlay suitable for use in making an absorbent liner fabric.

FIGURE 3 is illustrative of the interval bonding of the fabric liner to the rubber substrate in accordance with the invention. It shows a greatly magnified view of the rubber substrate 30 upon the top exposed surface 31 of which is intervally deposited in a spaced pattern a suitably tacky rubber-fabric adhesive. The fabric liner 32 is placed in contact with the adhesive spotted substrate and is bonded to the substrate through the adhesive spots 33 which anchor the fabric intervally upon subsequent drying and/or curing of the adhesive. As shown in the schematic representation of FIGURE 3, the knit fabric structure is anchored only at intervals to the substrate 30, thus permitting stretching of the fabric to its fullest extent in all areas intermediate the spaced bonding sites. The fabric liner 32 as shown in FIGURE 3 is made from yarn of a single material, for example, cotton of high absorbency, and of a knit structure which permits a maximum degree of stretch of the fabric.

Where greater stretch in the intervally bonded fabric liner is either desired or necessary, a fabric comprising a blend of yarns, for example, that illustrated in FIGURE 4 may be utilized to provide a combination of higher stretch characteristics, while retaining higher absorbency in the yarn contacting the skin. Such a material may be constructed of a core of stretchable yarn 35, such as Helanca or Banlon made of nylon or other synthetic fibers in which permanent coil or crimped structure is imparted to the filaments, the yarn being made of a plurality of filaments 36 with a cotton thread overlay or covering 37 helically wound on the stretch yarn core. The cotton overlay 37 is wrapped while the stretch core 35 is elongated or under tension with suitable spacing between the coils of the helix, and upon release of the tension the helically wound cotton thread is "condensed" or compressed into tighter or even contacting coils. A fabric liner made from such blended yarns may be secured to the substrate in the same manner illustrated in FIGURE 3 and will stretch to a much greater extent than in all cotton fabric. The structure of the yarn imparts to the cotton thread coverings a stretchability, so that it is extensible with the stretch yarn core.

FIGURE 5 illustrates on a magnified scale an alternative mode of interval bonding of the fabric liner to the rubber substrate. Where the elastomer substrate 30 is substantially uncured and is sufficiently plastic, the fabric 40 may be anchored by pressure-bonding without an adhesive coating. Pressure is exerted intervally or in spaced areas by means described below, and, as shown in FIGURE 5, the fabric is partially embedded in the surface of the rubber substrate providing anchorage at the spaced bonding sites 38. The fabric 40 moves with the substrate 30 at the fixed areas of anchorage when the rubber substrate is stretched. The fabric is preferably composed of composite yarn of relatively high extensibility, such as the aforementioned blend of Helanca with a cotton thread overlay. This provides stretch in the fabric to the fullest extent between points of anchorage to the substrate.

FIGURES 6 and 8 illustrate different modes of pressure-bonding the fabric intervally to the elastic substrate. In FIGURE 6 a dipping form 50 is shown with the deposited layer of latex rubber forming the girdle sheath 51 over which a stretchable fabric lining 52, preferably of the Helanca-cotton composite yarn, is smoothy drawn. A multipore mold 60 having movable side sections 61 and 62 on opposite sides of the dipping form, and movable end sections 63 and 64 on opposite ends of the dipping form are provided with a multiplicity of pressure fingers 65 which are located on the faces of the mold sections. These pressure fingers may be disposed in patterns like those shown in FIGURES 1, 2, 2a and 2b, or in random spaced arrangement. The fingers at their pressure applying ends are of any desired shape, but of a diameter to provide the desired pressure or contact area for the individual bonding site for anchoring the fabric to the substrate. The mold parts may be brought simultaneously or separately into engagement with the fabric, exerting sufficient pressure to embed it at spaced intervals in the uncured rubber substrate. Thereafter, the rubber or other elastomer may be cured to provide permanent anchorage of the fabric at spaced intervals, for example, as shown diagrammatically in FIGURE 5.

FIGURE 8 illustrates a mode for intervally bonding the fabric to the elastomer substrate when the latter is in the form of sheet stock. Rubber sheet stock 70 is supported and transported by means of tensioned endless belts 71 and 72 moving around pairs of rollers 73 and 74, and 75 and 76, respectively. As it nears the pressure-bonding station 80, the fabric liner 77 is fed onto the rubber substrate from payoff roll 78 and held in contact with the rubber sheet by guide roll 79 in front of the pressure-bonding station 80. Two cooperating pressure rolls 81 and 82 are driven at speeds synchronized with the speed of the supporting belts, roll 81 being provided with pressure fingers 83 arranged in spaced pattern or randomly distributed around the working surface of the roll. The pressure fingers engage the fabric and exert bonding pressure upon the fabric to embed the same in spaced areas in the rubber substrate, the latter being supported by the opposing roll 82. The intervally bonded composite may then be cured to permanently anchor the fabric in the surface of the substrate at the spaced multi-point bonding sites.

The figure slimming and contouring action of the garment is supplied in the main by the elastomer sheath at the elongation to which the garment is normally subjected in wearing position on the body. Consequently, the elastomer film must have a thickness sufficient to provide the resistance to stretch (modulus) necessary for this function. The elastomer film thickness generaly ranges from about 0.015 to about 0.030 inch. Where special reinforcement is desired the thickness may go up to about 0.100 inch.

In FIGURE 9 is shown an advantageous structure in which perforations 85 are provided in the rubber film 30 for ventilating the skin of the wearer. The perforations are made after bonding the fabric liner to the rubber substrate, and pass through the centers of the adhesive spots 86 (or the spaced bonding sites if no adhesive is used). In punching through the fabric, loose or fragmented yarn ends are formed. However, by perforating at the bonding sites, these loose fibers are embedded in the walls of the perforations and reinforce the holes against tear. Also, the embedding of the fabric ends prevent fraying of the liner at the perforations.

Although the invention has been described with particularity in reference to the specific embodiments shown in the drawings, it will be apparent to those skilled in the art that modifications may be made thereto. Alternative modes of intervally securing the fabric liner to the elastomer substrate may be adopted in the manufacture of foundation garments which are within the spirit and the intended scope of my invention. For example, a dipped seamless rubber girdle sheath may be stripped from a dipping form such as shown in FIGURE 6, and mounted in a stretched condition over two adjustably spaced rollers. The fabric liner is drawn tightly over the slightly stretched rubber film. A molding roller with pressure fingers similar to roll 81 may then be brought into pressure bearing relationship with one of the rolls on which the fabric-lined substrate is mounted. Rotation of the mounting rolls and the molding roll by means of a suitable drive mechanism presses the fabric into the rubber at intervals to pressure-bond it to the elastomer substrate.

Any suitable adhesive may be used in that embodiment of the invention where multiple spaced adhesive spots or areas are utilized for interval bonding, as long as it will function as an elastomer-fabric cementing or bonding agent. Among such adhesives may be mentioned rubber cement, rubber latex, and other elastic adhesives, as well as adhesives which are more inelastic by reason of thermosetting components.

The skin contacting fabric may be cotton or any other natural, or even synthetic, fiber which has the characteristics of high moisture absorbency and preferably soft hand or feel which is non-irritating to the skin. As mentioned above, the elastomer girdle sheath may be provided with perforations which may be formed prior to application of the fabric liner, as well as after the fabric is applied and intervally bonded.

I claim:

1. An elastic girdle of composite structure comprising an elastomeric substrate and a stretchable fabric liner having raised yarn surfaces therein, said fabric liner being substantially coextensive with said substrate and having a portion of its yarn surfaces laminated to said substrate at discontinuous, spaced sites, thereby substantially retaining in the girdle the individual stretch characteristics of the substrate and of the fabric liner.

2. Girdle of claim 1 in which said liner includes relatively non-absorbent yarn components in relatively intimate relationship with relatively absorbent yarn components.

3. Girdle of claim 1 in which said discontinuous, spaced sites are defined by spots of bonding material distributed over one surface of said substrate.

4. Girdle of claim 1 in which said discontinuous, spaced sites are defined by a series of spaced lines of bonding material distributed over one surface of said substrate.

5. Girdle of claim 1 in which the fabric liner is bonded to the elastomeric substrate by means of an elastic bonding material at said discontinuous, spaced sites.

6. Girdle of claim 5 in which said elastic bonding material is relatively wet adhesive which becomes elastic upon drying.

7. Girdle of claim 3 in which the elastomeric substrate is perforated through said discontinuous, spaced sites and portions of the liner are embedded in the walls of said perforations.

References Cited
UNITED STATES PATENTS

| | | | |
|---|---|---|---|
| 1,949,159 | 2/1934 | Glidden et al. | |
| 2,077,514 | 4/1937 | Callahan | 218—521 |
| 2,820,716 | 1/1958 | Harmon et al. | |

ADELE M. EAGER, Primary Examiner

U.S. Cl. X.R.

128—580; 156—160; 161—77